United States Patent [19]
Orr et al.

[11] Patent Number: 5,831,876
[45] Date of Patent: *Nov. 3, 1998

[54] METHOD FOR MONITORING REGIONAL AIR QUALITY

[75] Inventors: Wilson W. Orr, Mayer; Raymond M.P. Miller, Scottsdale, both of Ariz.

[73] Assignee: City of Scottsdale, an Arizona municipal coporation, Scottsdale, Ariz.

[ * ] Notice: The term of this patent shall not extend beyond the expiration date of Pat. No. 5,652,717.

[21] Appl. No.: 900,655

[22] Filed: Jul. 25, 1997

Related U.S. Application Data

[63] Continuation-in-part of Ser. No. 735,336, Oct. 22, 1996, Pat. No. 5,652,717, which is a continuation of Ser. No. 285,830, Aug. 4, 1994, abandoned.

[51] Int. Cl.$^6$ .................................................. G06T 17/50
[52] U.S. Cl. ........................................... 364/578; 395/930
[58] Field of Search ..................................... 364/578, 564, 364/512, 413.3; 324/323; 395/928, 930; 422/900; 434/130, 299; 356/338; 55/2; 250/338.5; 454/75

[56] References Cited

U.S. PATENT DOCUMENTS

| | | | |
|---|---|---|---|
| 4,362,387 | 12/1982 | Clark ........................................ | 356/338 |
| 4,868,771 | 9/1989 | Quick et al. ............................. | 364/578 |
| 4,890,249 | 12/1989 | Yen ......................................... | 364/578 |
| 4,911,737 | 3/1990 | Yehl et al. ................................. | 55/2 |
| 4,924,095 | 5/1990 | Swanson, Jr. ......................... | 250/338.5 |
| 5,005,147 | 4/1991 | Krishen et al. .......................... | 364/578 |
| 5,259,813 | 11/1993 | Abthoff et al. ............................ | 454/75 |
| 5,307,292 | 4/1994 | Brown et al. ............................ | 364/564 |
| 5,329,464 | 7/1994 | Sumic et al. ............................. | 364/512 |
| 5,375,074 | 12/1994 | Greenberg et al. ..................... | 364/578 |
| 5,652,717 | 7/1997 | Miller et al. ............................ | 364/578 |

OTHER PUBLICATIONS

"A Three–Dimensional/Stereoscopic Display and Model Control System for Great Lakes Forecasts,", by C. Yen, K. Bedford, J. Kempf and R. Marshall, IEEE Visualization Conference, 1990, pp. 194–201.

"Visualizing n–Dimensional Implications of Two–Dimensional design Decisions", by S. Ervin, IEEE Visualization Conference, 1992, pp. 356–360.

"Computer–Aided Modeling for Interference Analysis in Urban Areas", by T. Mizuike et al., GLOBECOM '92: IEEE Global Telecommunications Conference, 1992, pp. 1858–1864.

"Machine Learning from Remote Sensing Analysis", by D. Charebois, D. Goodenough and S. Matwin, IEEE, Remote Sensing for the Nineties, 1993 (IGARSS), pp. 165–172.

"ADSM—An Automated Distribution System Modeling Tool for Engineering Analyses", by X. Wei, Z. Sumic and S. Venkata, IEEE, Transmission and Distribution Conference, 1994, pp. 46–52.

"Geographic Information Systems: Are They Decision Support Systems?", by L. Murphy, IEEE, System Sciences, 1995 Annual Hawaii Int'L Conference, vol. IV, pp. 131–140.

*Primary Examiner*—Kevin J. Teska
*Assistant Examiner*—Russell W. Frejd
*Attorney, Agent, or Firm*—Cahill, Sutton & Thomas P.L.C.

[57] ABSTRACT

A method for monitoring air pollution within a significant atmospheric volume and for providing real time and projected results and effects based upon varying the inputted data as a function of pollution abatement procedures that might be implemented. Data collected from a plurality of sources are converted into an electronic database which may be automatically and/or periodically updated. A series of software modules utilize the data for a series of specific representations. The output provided by modeling and simulation modules may be in the form of two- or three-dimensional visual presentations in a specially equipped multiple, computer-driven, projector screen room. The output may also be in the form of printed media for binding and distribution with screen images combined with text.

24 Claims, 4 Drawing Sheets

METHOD FOR MONITORING REGIONAL AIR QUALITY

CROSS-REFERENCE TO RELATED APPLICATIONS

The present application is a continuation-in-part application of an application entitled "APPARATUS AND METHOD FOR COLLECTING, ANALYZING AND PRESENTING GEOGRAPHICAL INFORMATION", filed Oct. 22, 1996 and assigned Ser. No. 08/735,336, now U.S. Pat. No. 5,652,717 issued Jul. 29, 1997, which is a continuation of application Ser. No. 08/285,830, filed Aug. 4, 1994, now abandoned, and describing an invention of the present inventors.

BACKGROUND OF THE INVENTION

1. Field of the Invention

The present invention relates to the collection, integration, manipulation, modeling, and presentation of various local, regional, and/or global data and, more particularly, to a method for monitoring regional air quality as a function of real time and historic data obtained manually and automatically from a plurality of sources.

2. Description of Related Art

Air quality monitoring is performed in accordance with federal mandates from the Environment Protection Agency. Additionally, many regional jurisdictions monitor airborne pollutants carried by prevailing winds across the respective regions. Air quality data is collected for operational purposes using in situ measuring stations placed in known pollutant intensive areas of various regions. These stations are seldom moved and provide a record of pollutants only at the respective specific sites. Although the data collected may be excellent at the specific data collection stations at an elevation of 10–15 feet above ground level, the levels of pollutants some distance from each station and at higher elevations are unknown; any statements of such pollutant levels are primarily based upon inference. For a metropolitan region of some 600 square miles with tropospheric pollution extending to 35,000 feet above ground, the volume of polluted air is almost 4,000 cubic miles. Typically, a region of this size will have 18 in situ monitoring stations or one for every 33.33 square miles. Based upon this spacing and taking into account the entire column of tropospheric air above each station, the data provided from each station is used to determine the pollutant level of 222 cubic miles of air. Thus, a very limited amount of data is acquired relative to a huge volume of air. Even though a relatively small sum is spent on air quality monitoring and even though it is known that the data collected is suspect as being pertinent to the volume ascribed to each station, the data gathered controls the flow of a very significant revenue stream. For example, large sums of federal highway monies are made available to jurisdictions which are deemed in compliance with current standards for a given set of pollutants. Jurisdictions failing to comply are judged "nonattainment areas" and the federal highway monies allotted may be reduced significantly.

SUMMARY OF THE INVENTION

The present invention is directed to a method for monitoring regional air quality by continually acquiring air quality data within a range of altitudes and storing, preprocessing, transmitting, and inputting this data into a computer system. The inputted data is integrated from various ground based sensors and above ground sensors. A summary of the data is presented in real time for each origin, along with data related to recombination due to effects of sunlight, heat, wind, trace elements, etc. and data related to movement of the air pollutants. Some of the data is acquired by a series of ground based upward looking lidar installations and/or satellite and/or aircraft carried lidar installations with downward, or scanning capabilities. The upward looking ground based installations are composed of a series of lidar installations which rotate in azimuth and elevation to sweep an upward cone. The operating frequencies of the lidars, whether upward looking or downward looking, are selected as a function of the responsiveness of particular pollutants or atmospheric constituents that will yield return pulses. The lidar data may be augmented with multispectral data from airborne and/or satellite platforms. Moreover, the multispectral data may reinforce confidence in certain lidar data while providing some basis for doubt with respect to other data. Presentation of data is continuous and in a three-dimensional format superimposed over a three-dimensional rendering of the region's land surface. Such configuration provides decisionmakers with the capability to trade off air pollution mitigation expenditures and policies with simulated but expected results and the attendant health and other benefits.

It is therefore a primary object of the present invention to provide a method for detecting airborne pollutants high above conventional ground based sensors.

Another object of the present invention is to provide a method for monitoring the air quality of a significant volume of air above the ground surface.

Still another object of the present invention is to provide a method for collecting data on air pollutants in a range of altitude above the ground surface and to present pictorially images representing the pollutants present.

Yet another object of the present invention is to provide a method for presenting real time data in three-dimensional visually perceivable images of the pollutants present.

A further object of the present invention is to provide a method for collecting and integrating data from various sensor platforms to provide data on pollutants present through a significant altitude above the ground.

A still further object of the present invention is to provide visually perceivable images on a real time basis of pollutants present in the atmosphere through a significant altitude above the ground.

A yet further object of the present invention is to provide a method for simulating scenarios for abating airborne pollutants and presenting such scenarios in two- and three-dimensional images to determine effective abatement procedures commensurate with costs.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DETAILED DESCRIPTION OF THE PREFERRED EMBODIMENT

Figure 1:
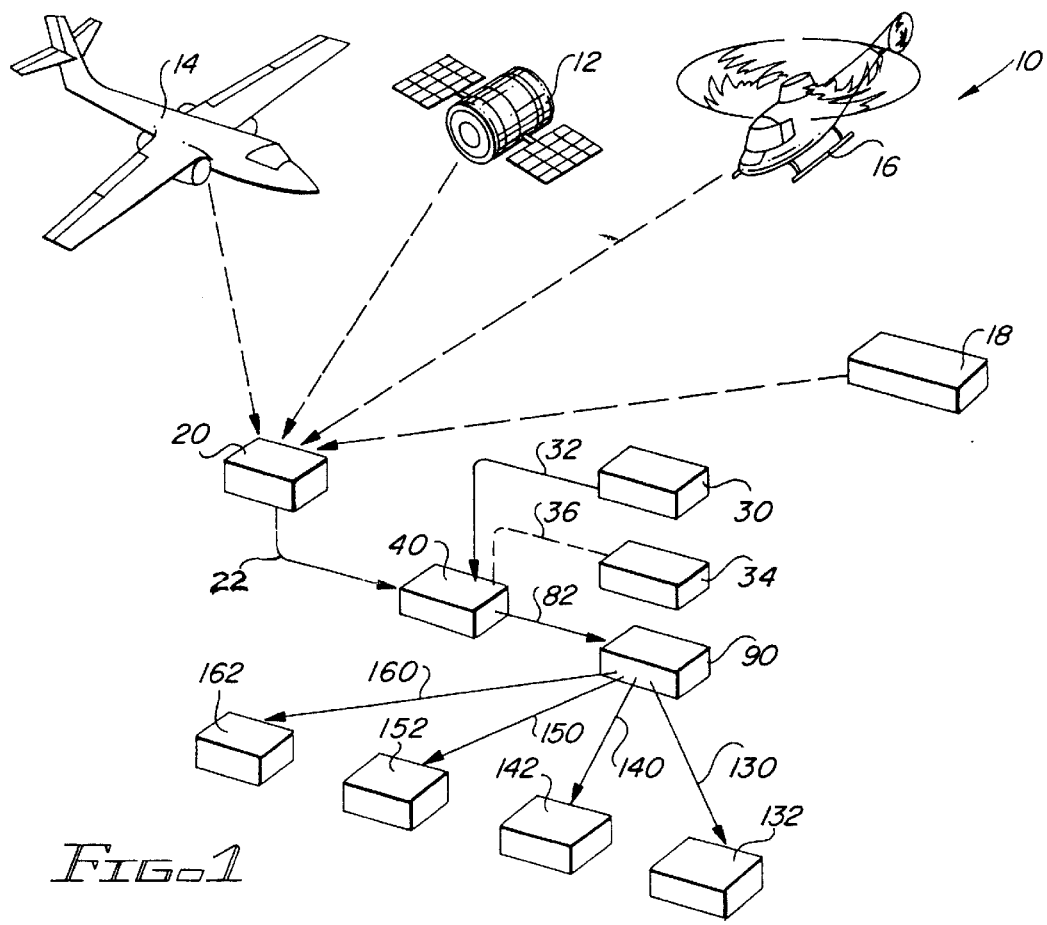
FIG. 1 is a block diagram schematically representing the information gathering and routing system.
Figure 2:
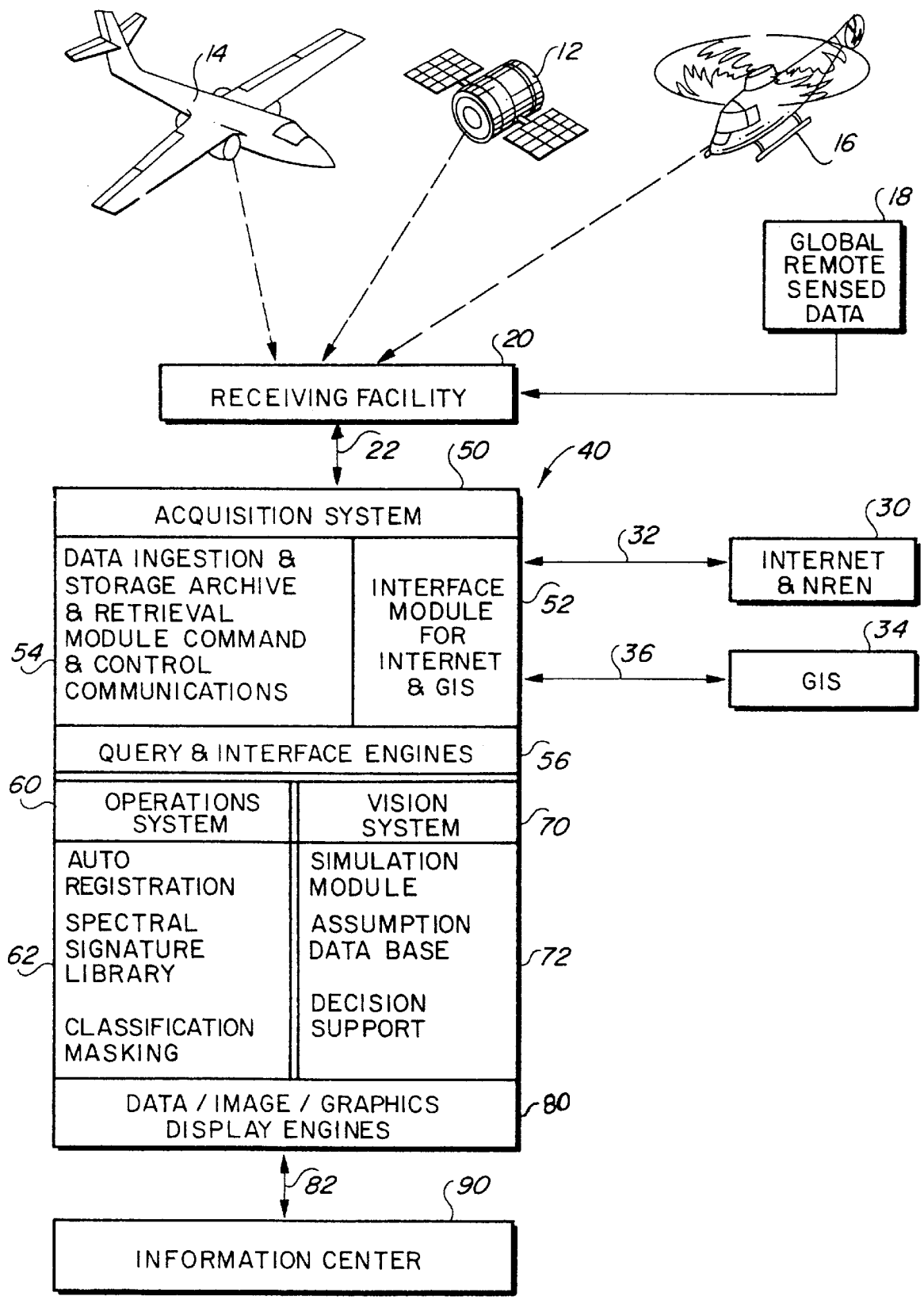
FIG. 2 is a block diagram depicting subsystems of the system shown in FIG. 1.

Referring to FIG. 1, there is shown a block diagram schematically illustrating an enhanced geographical information system 10. In particular, it illustrates the gathering of the information to be processed and the flow of the information after the gathering, including the processing and distribution of the information to ultimate users. FIG. 2 illustrates some of the hardware and software modules embodied in and broadly shown in FIG. 1. Information in any of various formats may be received by a data reception ground station 20 from several different sources. These sources may include an earth circling satellite 12, an aircraft 14, and a helicopter 16. The helicopter represents a local aircraft or an earth bound fixed sensor, such as a sensor atop a mountain or a tall building, etc., which gathers essentially local information. Aircraft 14 may be a type of reconnaissance aircraft that may cover a relatively large area for data gathering purposes. For example, aircraft 14 may provide multispectral radar, and lidar information, infrared data, photographs, and/or other information and helicopter 16 may provide primarily photographic and video information of a local area or some part or parts thereof. Satellite 12 may provide multispectral radar data, radar data, photographic information, infrared data, lidar data, sidar data and the like. There are many kinds or sources of data that are now available, and more types of sources of data will be available in the future, which are representatively depicted by satellite 12, aircraft 14, and helicopter 16. With contemporary technology, data from any of these sources may be transmitted to one or more earth stations 20.

With respect to terminology, it will be noted that multispectral data or information is generally considered as passive systems for deriving information. Radar, lidar, and sidar are typically considered active systems for deriving information from a transmitted signal reflected by an object of interest and received at a receiving station. Global remote sensed information/data, including global positioning system (GPS) and global climate change models, may be received by ground station 20. A block 18 represents the source(s) for such information/data.

The information/data gathered is transmitted from ground station 20 through appropriate transmission elements 22, such as wireless, fiberoptics, or cable elements to a central location 40. The central location includes the software and hardware necessary for processing the received information incorporated in three primary systems. These primary systems are an acquisition system 50, an operations system 60, and a vision system 70. The acquisition system includes an interface module 52 for receiving information from an Internet and a NREN station 30 through transmission line 32 and from GIS station 34 through transmission line 36. These stations provide regional and global information, respectively. The information available from Internet and NREN station 30 may come from any number of centers or sources. The data is transmitted to the interface module 52 from stations 30,34 by appropriate communications channels or transmission lines, as depicted.

Data may be received from numerous sources, as indicated above, such as from land based, airborne or space based sensor platforms, or from data libraries of various types. The data may be fed directly to central location 40 in real time or near real time. Remote sensed data, such as multispectral radar, lidar, and sidar, is routed to central location 40 where it is processed, manipulated, and archived. At the central station, data is routed to the appropriate hardware and software elements, as desired or required. The information represented by the data is analyzed, collated, and processed appropriately for use. The "use" may be multiple uses, depending on the users. That is, different users may desire different information, and the information is processed to provide single or multiple users with virtually any type of information from the data. The data may be retrieved, further manipulated, and presented through use of software and hardware elements in an interactive venue, such as might be designed for group decision support in a setting, such as an information center 90 illustrated in FIG. 3.

Three primary systems are integrated, as best shown in FIG. 2. One system is acquisition system 50, the second system is operations system 60, and the third system is vision or visioning system 70. Acquisition system 50 includes an interface module 52 which may interface with a generic geographic information system (GIS) station 34. Module 52 provides the interface software for subroutines with the generic GIS and the communications software for direct linkage with remote sensors. It may link continuously with several different sensor instruments on satellites or aircraft that provide selective hyperspectral scanning of the electromagnetic spectrum, radar imagery, which may be multi-polarized, and laser imagery (lidar), which may be similarly polarized. The module may then provide instantaneous or prerecorded information of value to the users. Initial processing of raw multispectral, real time data from aerial and space based platforms is performed within this module and it includes the hardware necessary to run the software and to facilitate data movement. After initial processing of the Internet and NREN data received from station 30 by interface module 52, the module communicates with a module 54 that provides various functions, such as data ingestion and storage, archive and retrieval, command and control, and communications relevant to the processed data.

Figure 3:
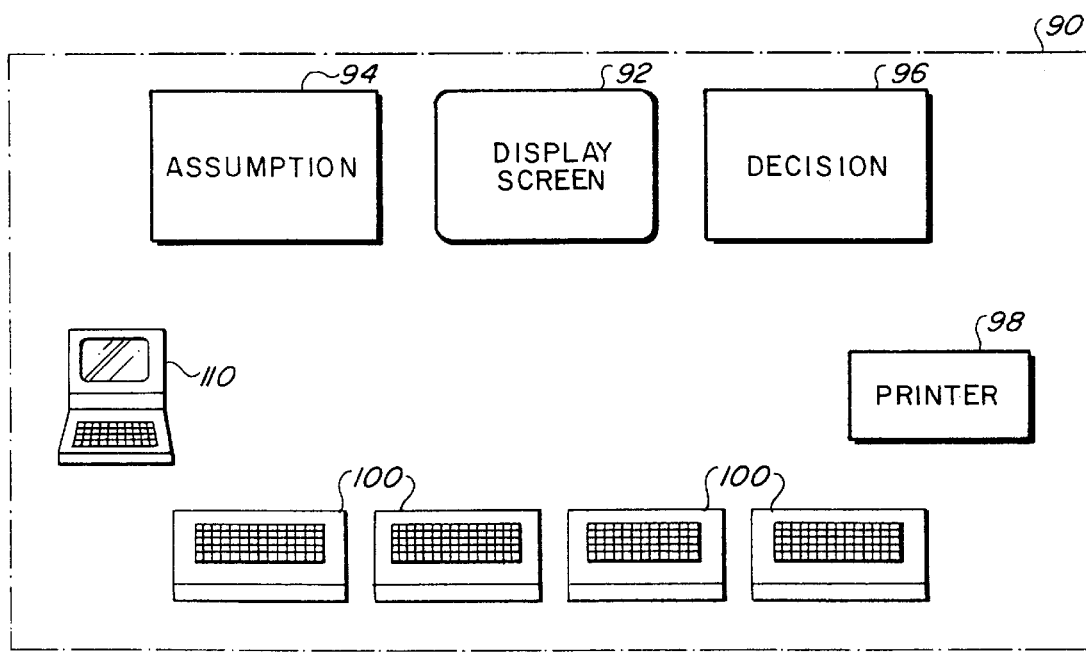
FIG. 3 is a block diagram illustrating an information center.

A plurality of direct display screens 92 may be used in information center 90 and controlled by interactive keyboards/LCD displays (consoles 100), as shown in FIG. 3. For example, a user may wish to see the aerial photography for a one mile buffer around a specific land address. The information is passed to the database query and interface engine 56 (FIG. 2) which locates the appropriate records. A unique identifier and task request is sent to block 80 wherein a graphics engine expands the geometry of the subject parcel of land for the one mile radius. Finally, the geometry of the buffer is passed to an image display engine and a data display engine which extracts only the portion of the image needed and sends the results on a transmission line 82 to a display screen 92 for display at information center 90.

Operations system 60 provides for remote sensed data transfer, manipulation, and display for current operations and user functions through software. Some of the functions include auto registration, spectral signature library, classification, and masking, as illustrated in block 62. The essential functions or sub modules for operations system 60, as listed in abbreviated form in block 62, include:

1. Automatic registration of multi-spectral, hyperspectral, radar, or lidar imagery:

a) This module contains the subroutines necessary to automatically identify the data imagery type and to auto register, or align, this imagery or attribute information with the GIS database; and b) The GIS database provides known ground features to provide overall control points for rectification of the imagery. Only features with pronounced active or passive signatures, static physical characteristics and appropriate geographic locations will be identified, such as a canal, tree, vehicle, or building, etc. An algorithm then analyzes the imagery and matches the known ground control shapes, transferring the coordinate geometry of the GIS database features to the given image. This operation may be done through several correcting iterative processes by increasing the number of ground control features each time until an acceptable deviation is achieved.

2. High resolution multispectral, radar, and lidar imaging signature libraries:

a) This library provides reference data for atmospheric, land surface, and subsurface features, vegetation, life forms, conditions, and attributes within any desired region, such as, for example, the southwestern United States region. This is a reference library for comparison with new remote sensed data, permitting feature identification, whether atmospheric, land surface, or subsurface;

b) GIS registered, high resolution, multispectral, and radar or lidar imagery is ground truthed and synthesized to build an optimal signature library. The imagery is superimposed with known features within the GIS database, such as pavement, roof tops, etc., to determine the most common signature return for the given feature;

c) Since many factors can affect the signature return of any given feature, such as angle or pitch of the camera, shadows, etc., variances in the signature library occur. These variances are mathematically calculated to determine allowable tolerances within the signature band for each feature. Each spectral band within the spectral range for a given feature is examined for return values and optimally predictive values are calculated. This depicts the most common spectral return for the given band; and d) Next, tolerances are calculated by finding the minimum and maximum values in which a certain percentage of the returns for a given band belong. Finally, the signature library elements are tested and verified against or with known signatures for the region's known imagery to insure the classification accuracy of the data.

3. Classification module:

a) This module interprets the data stream and is equipped to recognize atmospheric, surface, and subsurface constituent features and attributes by spectral signature or reflected image comparison with reference to the signature library discussed above.

4. Masking module:

a) This module scans the data to produce an image which will present special features, such as a roof type or hydrant location, for example, and search for a given signature or indication, such as a particular pollutant, vegetation type, land characteristic, attribute, or object, or for a given coordinate set with a listing of selected attributes; and b) Following classification and/or masking, data are sent to the vision system or to an integrated user interface module, discussed below, for display and dissemination to a user. Data may be returned to vision system 70 repeatedly for additional processing, as desired. Geographical addressing, coordinate selection, attribute queuing, and zoom or magnification features are contained within this module.

General applications developed using vision system 70 include:

1. Environmental change monitoring, compliance, and enforcement;
2. Transportation monitoring, analysis, and planning;
3. General planning, growth assessment, and management;
4. Zoning and building code enforcement; and
5. Public protection and emergency/disaster response services.

Sample applications of this vision system include: hazardous materials dumping by type, location, and time; police (law enforcement) transit, service, utility, or other vehicle location and status; watershed status; impending weather related events; regionally coordinated disaster incident management; traffic vehicle counts by time of day and location; tracking of vehicles, biological and nonbiological objects, or other entities; transportation planning; zoning monitoring and enforcement; crime evidence gathering; development plan review and tracking; air quality analysis; sources and movement of pollutants; long term trends of various types; construction progress monitoring; and permit and other violations.

Visioning system 70 may provide dynamic visual and financial simulations of a region's future, given an assumption set and a predetermined series of development or policy decisions. It is intended to project into a long range time frame and incorporate global change data through a high speed data channel. Global data is regionalized, utilizing special subprogram software to combine emerging local climatic models with larger data sets. This subprogram accesses global environmental information data and modeling to assist a municipality in developing long term strategies which integrate with global environmental trends and emerging guidelines for sustainable development.

The following subroutines, depicted in block 72, are a part of vision system 70:

1. Simulation:

a) Digital image manipulation and simulation capability utilizes advanced processing capabilities applied to environmental, economic, and social models developed as part of the module subroutines; and b) Optical image manipulation and simulation also utilizes advanced processing, but filters the image of elements not requiring update for the next image. An image library is established for a local community to use for fly through/bys and "what if" scenario generations.

2. Assumption Set and Database:

Simulation scenarios derive from a set of assumptions, regarding, in part:

a) Global/regional/local environmental factors (climate change, costs assigned to pollutants, new pollutants, totally internalized resource costs);

b) Global/regional/local economic factors (rate of inflation, interest rates, sources of GNP and local incomes, new products and specification, existing material and product performance specifications, areas, tax rates); and c) Global/regional/local social, cultural, demographic factors (population forecasts, health costs, educational levels and provisions).

3. Decision Support Module:
   a) Simulation scenarios depend on the policy and development decisions made by a community, government, or user organization. These are categorized in this module to include likely outcomes for a variety of policies, development alternatives, and infrastructure projections with regard to cost, usage rates, and life cycle costing of materials.

This module includes group decision support software which may be user confidential and individually interactive at each user's console 100, (see FIG. 3), and at remote locations. A typical facility is depicted in FIG. 3 as information center 90 that may serve citizens, council commissions, senior management/planning meetings, etc. Obviously, this facility may be adapted to various user groups or organizations requiring the integration of multiple data sets, imagery, and group decision support software.

The entire system is appropriately interconnected, such as by fiber optics, to all appropriate user departments and offices to create a virtual network that integrates across user groups. As a national "Information Highway" is developed, the system may be connected to include other, or more, remote locations.

Information center 90 includes a plurality of interactive consoles 100 connected to the central location 40 by appropriate elements. A plurality of communications lines 130, 140, 150, and 160 are illustrated in FIG. 1 as extending to different centers 132, 142, 152, and 162, respectively, where the gathered and processed information may be used by users. One such user may be information center 90, connected to the central location 40 by an appropriate transmission line 82 from data/image/graphics display engines depicted in block 80. Block 80 represents the software and hardware which interfaces with the information center 90 and the central location 40. It will be understood that the various modules, engines, etc., within the central location 40 communicate with each other as required to analyze, retrieve, etc., the data as requested by users at consoles 100 . . . 106, etc.

At the front of the information center 90, and in front of the consoles 100, may be a large display screen 92. By use of the consoles 100, the users may call up and have displayed desired information on the display screen. Moreover, the information displayed on display screen 92 may be manipulated and otherwise used or varied as desired. A master control console or facilitator console 110 is shown in FIG. 3.

Some examples of the applications available are set out below. The examples are illustrative only, and not exclusive. Different users may sit at consoles 100. Facilitator console 110 may provide assistance for the users at the consoles. Hard copies of data may be provided by a plotter or printer 98 or similar image/data rendering device, or transmitted to a playback device for later usage, as desired.

On opposite sides of the display screen 92 are an assumption screen 94 and a decision screen 96. The purpose of these screens is to aid the users in making decisions based on provided data. The assumptions may include resource, pollutant costs as a minimum in arriving at proper decisions. Decision screen 96 will display the chosen decision tree, generally regarding changes to the natural environment. The display screen 92 will display visually and dynamically the long term results of the proposed changes.

Remote centers 132, 142, 152, and 162 are shown in FIG. 1. These remote centers may represent departments, agencies, private individuals or entities, schools and universities, federal agencies, other political units, etc., tied into or part of system 10.

The following examples set forth various and representative uses that may be accommodated by system 10:

EXAMPLE NO. 1

An "old" nap shows water meters and sewer manholes at specific locations on a given street. With a hand held GPS transmitter, a person may walk along the street and activate the GPS transmitter at the water meters and manholes. GIS satellites receive the transmissions and relay the coordinates of the exact locations from where the transmissions were sent. The information is processed and is used to verify the "old" information and to correct any errors. The "new" information thus received and processed provides correct location information for the various water meter and sewer manholes.

EXAMPLE NO. 2

A new subdivision is planned for a section of land which includes hills, dry water courses and certain types of desired vegetation. The section of land has been photographed, etc., and the information is in the system memory. The information on the desired section is brought up on a computer screen and the information is analyzed. Appropriate printouts may be made for detailed analysis. The information provided includes details on the vegetation so that lot lines, roads, etc., may be plotted to have minimum adverse effect on the vegetation and on the natural water courses, etc.

EXAMPLE NO. 3

Aerial photographs of an area are processed with maps to show correct lot boundaries, misaligned walls and fences, and other desired information.

EXAMPLE NO. 4

Radar imagery is preprocessed and auto registered to a GIS mapping system which overlays parcel property lines. The resulting image can be automatically interpreted or "read" to determine the surface area and percent slope on any given ownership parcel. This yields buildable/ unbuildable percentages and ultimately derives a slope analysis for the parcel. These parcels, and their attributes, can be aggregated to provide a basis for transaction negotiations, tax assessment, and other values which are slope dependent. The radar data provides highly accurate elevation data from the which the slope composite imagery is constructed.

EXAMPLE NO. 5

An agency responsible for reviewing, revising, approving, monitoring construction progress, and otherwise dealing with land use and architectural plans may require these to be submitted in computer assisted design (CAD) format on magnetic or optical media. Plans thus digitized may be merged into the GIS resident, remote sensed imagery to create dynamic, three-dimensional and realistic presentations of the finished development of a capital improvement project. The simulation software merges the digitized plan with change models and simulates visually how the project will look in the distant future. Plan check submodules approve, or disapprove the project based on its long term impacts as determined by this simulation capability.

EXAMPLE NO. 6

The visual simulations set forth in Example 5, above, may be integrated with economic, social, and environmental cost forecasts to determine a project's impact on the sustainability of the community, or ability to function without negatively impacting the future wellbeing of the community.

EXAMPLE NO. 7

A developer's plans are submitted on electronic optical or magnetic media and integrated with existing regulatory data and video of the proposed area to 1) verify plan compliance with city/state/federal codes, and 2) simulate how the proposed project, if built, would appear and impact the community in the distant future.

EXAMPLE NO. 8

City planners utilize the system to design and update the city's land use plan. Transportation planners, storm water planners, etc., will visualize the land use plan concurrently during the design phase and assess impacts of the plan with regard to transportation, storm water, etc. Recommendations and manipulations can be made by the transportation planner and the impact of such recommendations and manipulations can be visualized in three-dimensions. This process allows for group interaction in city planning through the integration of existing city models and the visualization of model inputs and outputs.

Figure 4:
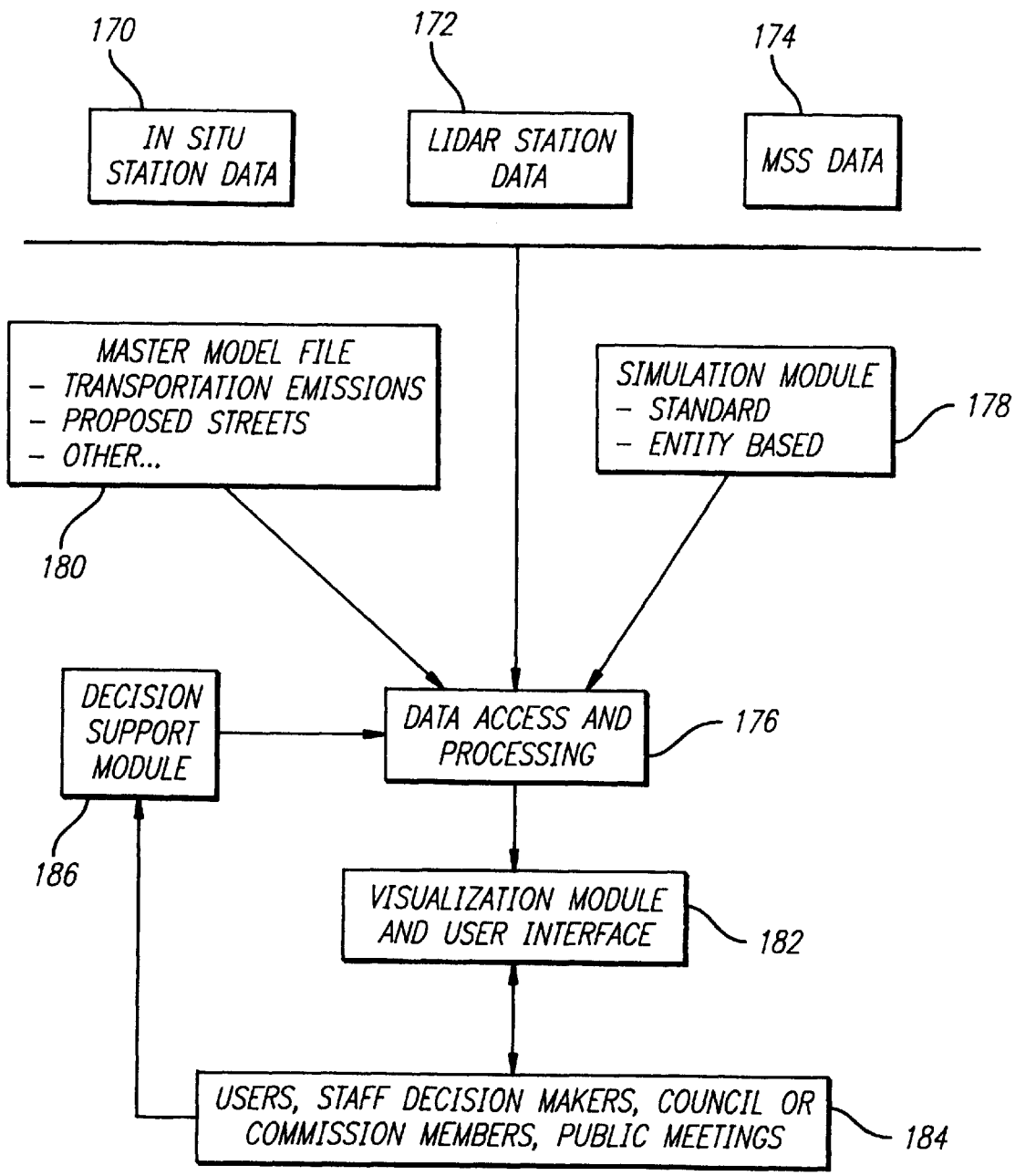
FIG. 4 illustrates a block diagram for collecting, processing, and presenting data related to airborne pollution and for simulating scenarios in an effort to abate the pollution.

Referring to FIG. 4, there is illustrated a block diagram of a process for developing air quality related data and correlating such data with data from other sources having a sufficiently direct or indirect impact upon the presence of air pollutants. Block 170 represents data collected from existing air quality monitoring stations, all of which are essentially ground based and sample the air a few feet above the ground. Block 172 represents data obtained from a plurality of ground based lidar installations which scan vertically aligned and overlapping cones of the lower troposphere. The frequency of the signals emitted may be selected to obtain returns from particular pollutants or atmospheric constituents under investigation. Lidar data may also be collected from downward looking airborne or satellite borne stations. Block 174 represents multispectral data produced by airborne and/or satellite platforms, as described above with respect to FIGS. 1 and 2. The multispectral data collected may reinforce confidence in certain of the lidar data obtained while providing a basis for doubt of the accuracy of other data collected. The multispectral data may be stored and later retrieved for use or processed real time for integration with other data collected.

These multiple sources of data are integrated by data access and processing module 176. It stores the data collected and responds to queries by a user. This module includes algorithms for determining the routing of user information and/or data requests. If the request is for a simulation of an expected outcome, given certain decisions or occurrences, the request is routed to simulation module 178 for simulation processing. A master model file 180 includes data related to ground based functions that change relatively slowly. Such data may include data collected relative to transportation related emissions, existing and proposed streets, traffic densities and numerous other factors relating to or having a bearing upon generation of airborne pollutants. The data from file 180 is processed within block 176 and available as required.

Simulation module 178 can collect and integrate all extant but heretofore isolated models descriptive of air quality. These include transportation emissions (a major pollutant source), models of a variety of transportation modes, changes to the transportation system (additional new streets, freeways, etc.), changes in fuel type and economic trends which are a factor of vehicular miles traveled; all of this data may be part of file 180. Module 178 also contains the software necessary to integrate, combine, format, and simplify the outputs of these individual model elements, which are factors in air quality. The module adds a fourth dimension, time, to the two- or three-dimensional models resident in and forming a part of the simulation module. By applying a variety of assumptions and decision options to single or integrated models, the results occurring at a later time based upon current decisions may be developed. The methods of data simulation include the ability to accept a different set of input factors and to produce a simulated situation of the air quality at a future time. This module will also be capable of trend extrapolation for a variety of data sets by using various methodologies, i.e. linear, logarithmic, cross index, etc. Possible outcomes or results will be generated for a range of alternative actions. Moreover, it is possible to model the relationships between air quality and fiscal expenditures in a variety of mitigation alternatives; such relationships can be presented visually in a two- or a three-dimensional image of the area of interest.

The two- and/or three-dimensional images are produced by visualization module 182. This model includes an interface capability to permit a user to input queries and requests pertinent to information sought relevant to decisions to be made. Such users may include various members of a governing body such as staff decisionmakers, council or commission members or members of the public present at public meetings where air quality is a subject; these users are represented by block 184. A decision support module 186 may be used by users to obtain data and simulations relevant to actual or proposed decisions relevant to abatement of airborne pollutants.

The present invention will speed the acquisition of accurate data, enhance and clarify presentation of the data to decisionmakers and simplify complex decisions which attempt to balance public risk associated with poor air quality with public mitigation strategies and investments. In particular, it has the ability to alter the air quality scenario, real time and on screen, to portray different pollutant levels on demand by use of a software slider (a screen icon) for pollutant density/origin and derivative products. The present invention also has the ability to alter the pollutant loading relevant to mitigation strategies and investments using a second software slider (icon) selecting varying levels of public investment or various public policies in force or to be implemented. Additional and supporting screens will portray property damage and loss of life predictions as a function of air quality pollution mitigation investments, investment cost scenarios based on a variety of interest rates coupled with funding through issuance of bonds, and demographic/economic activity data relative to public opinion and the resulting impact upon the governing body.

Methods for data presentation by module 182 will be described below. Specially developed software will be capable of moving the viewer(s) in real time through a real or simulated representation of the area of interest in a three-dimensional context in current or future time. The visualization module will also overlay or co-display charted two-dimensional data sets which will change to portray data dynamically as the spatial or temporal aspect of the viewer(s) is varied. Thereby, complex data will be portrayed using simple visual media.

Figure 5:
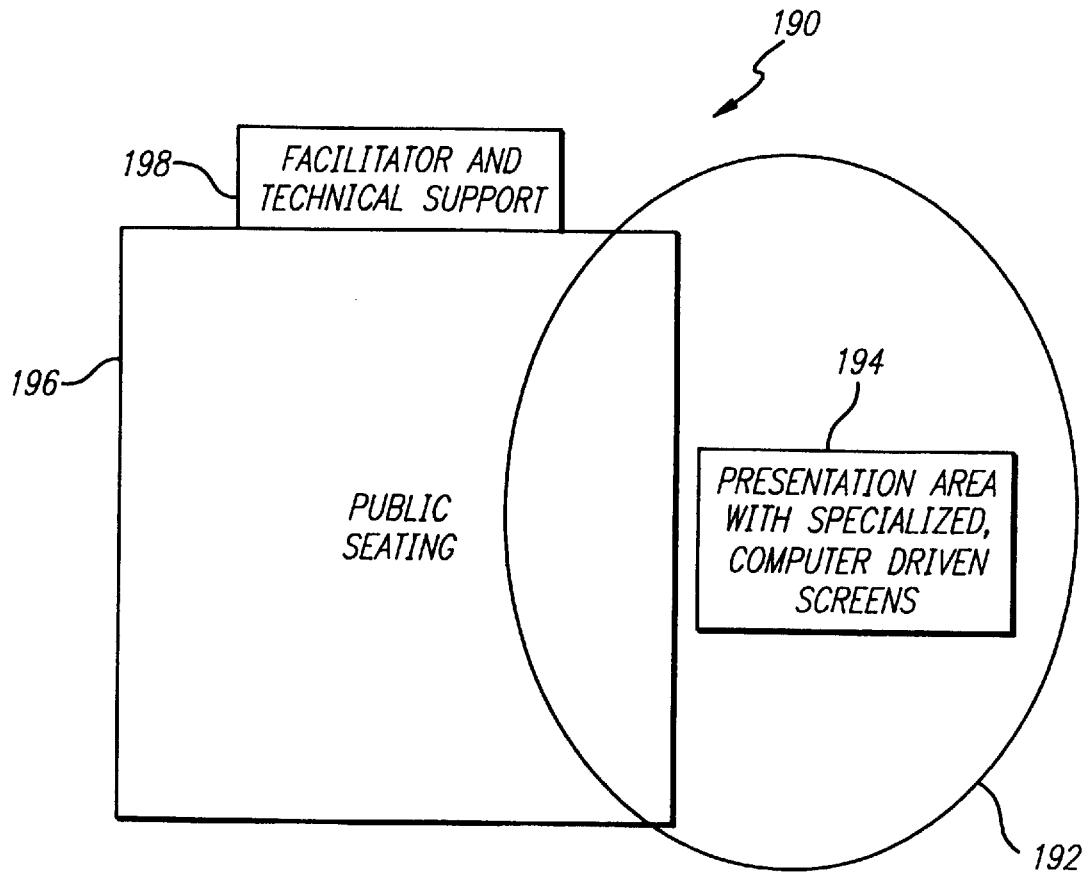
FIG. 5 illustrates a facility for studying and analyzing displayed information on the status of air pollution present and simulated scenarios for abating same.

Referring to FIG. 5, there is shown a representative facility 190 for monitoring air quality on an ongoing or interim basis. A presentation area 192 includes accommodation for a speaker(s) and multiple screens, as represented by block 194. These screens will create two- and/or three-dimensional images for review, analysis, and study pursuant to queries or requests made. An area 196 is set aside for public seating or seating by invitation only. A facilitator and technical support is provided, as represented by block 198, to assist in the presentation of real time situations, simulated scenarios and projected air quality standards as a result of various pollution mitigation activities that may be undertaken. Furthermore, multiple computer driven screens may be used to facilitate the display of a two-dimensional geographical information system map showing the area under consideration. Additional screens showing, or moving through, three-dimensional imagery may be incorporated. Other considerations which are variable, such as cost factors and risk exposure, may be shown as variables dependent upon actual or proposed actions to be taken. In summary, the present invention will speed the acquisition of accurate data, enhance and clarify its presentation to decisionmakers and simplify the complex decisions which attempt to balance public risk with public investment.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A method for monitoring regional air quality by collecting real time and historic data within an altitude of interest above the ground and presenting a multi-dimensional image of the pollutants present, said method comprising the steps of:
   (a) acquiring factual natural and man-made air quality information on a real time basis;
   (b) identifying subject matter of the real time factual information;
   (c) ingesting and storing the identified factual information;
   (d) retrieving pre-existing factual air quality information of selected subject matter from a source;
   (e) correlating selected ingested information with corresponding retrieved information;
   (f) compiling the correlated information;
   (g) analyzing the compiled information to obtain simulation scenarios of the impact upon the presence of pollutants due to either actual or anticipated variations of the factual information; and
   (h) selectively presenting the compiled or analyzed information for review and study.

2. The method as set forth in claim 1 including the step of deleting any retrieved information commensurate with any ingested information to render most current the correlated information.

3. The method as set forth in claim 1 including the step of simulating the pollutants present in at least one future time period based upon the ingested and the retrieved information.

4. The method as set forth in claim 1 wherein said step of retrieving includes the step of using the retrieved air quality information and the ingested information to develop simulated air quality information in a predetermined time period.

5. The method as set forth in claim 1 wherein said step of presenting includes the step of imaging a selected one of the compiled information and the simulation scenarios in a visually perceivable format.

6. The method as set forth in claim 1 wherein said step of presenting includes the step of displaying the compiled information in more than one format.

7. The method as set forth in claim 1 wherein said step of correlating includes the step of creating different combinations of the ingested information and the retrieved information and wherein said step of compiling produces a plurality of compilations of information.

8. The method as set forth in claim 7 wherein said step of presenting includes presentation of the plurality of compilations.

9. The method as set forth in claim 1 wherein said step of presenting includes the step of displaying the projections resulting from said step of analyzing.

10. The method as set forth in claim 9 wherein said step of displaying includes the step of displaying the projections in more than one format.

11. The method as set forth in claim 1 including the step of simulating the effect upon the compiled information as a result of varying the factual information.

12. A method for collecting natural and man-made information relating to air quality within an altitude of interest and presenting a multi-dimensional image of the pollutants present, said method comprising the steps of:
   (a) acquiring factual natural and man-made air quality information on a real time basis;
   (b) identifying subject matter of the real time factual information;
   (c) retrieving pre-existing factual air quality information of selected subject matter from a source;
   (d) correlating selected identified information with corresponding retrieved information;
   (e) analyzing the correlated information to obtain simulation scenarios of the impact upon the pollutants present due to either actual or anticipated future variations of factual information; and
   (f) selectively presenting the correlated and analyzed information.

13. The method as set forth in claim 12 wherein said step of correlating includes the step of replacing the retrieved information with corresponding acquired information to present up-to-date factual information.

14. The method as set forth in claim 12 wherein said step of correlating includes the step of compiling the correlated information in more than one time period.

15. The method as set forth in claim 13 wherein said step of correlating includes the step of compiling the correlated information in more than one time period.

16. The method as set forth in claim 12 wherein said step of presenting includes the step of imaging a selected one of the correlated information and the simulation scenarios in a visually perceivable format.

17. The method as set forth in claim 12 wherein said step of presenting includes the step of displaying the correlated information.

18. The method as set forth in claim 12 wherein said step of presenting includes the step of displaying the projections resulting from said step of analyzing.

19. The method as set forth in claim 18 wherein said step of displaying includes the step of displaying the projections in more than one format.

20. The method as set forth in claim 12 including the step of simulating the effect upon the correlated information as a result of varying the factual information.

21. A method for projecting the effect on air quality resulting from varying collected natural and man-made air quality information, said method comprising the steps of:

(a) acquiring factual natural and man-made air quality information on a real time basis;

(b) identifying subject matter of the real time factual information;

(c) ingesting and storing the identified factual information;

(d) retrieving pre-existing factual air quality information of selected subject matter from a source;

(e) correlating selected ingested information with corresponding retrieved information;

(f) varying selected parameters of the ingested factual information;

(g) compiling the correlated information and the varied information;

(h) analyzing the compiled information to obtain simulation scenarios of the impact upon air pollution resulting from the selected variations of the factual information; and (i) presenting the analyzed simulation scenarios for review and study.

22. A method for projecting the effect on air quality resulting from varying collected natural and man-made air quality information, said method comprising the steps of:

(a) acquiring factual natural and man-made air quality information on a real time basis;

(b) identifying subject matter of the real time factual information;

(c) ingesting and storing the identified factual information;

(d) retrieving pre-existing factual air quality information of selected subject matter from a source;

(e) correlating selected ingested information with corresponding retrieved information;

(f) varying selected parameters of the acquired factual information;

(g) compiling the correlated information and the varied information;

(h) analyzing the compiled information to obtain simulation scenarios of the impact upon air pollution resulting from the selected variations of the factual information; and (i) presenting the analyzed simulation scenarios for review and study.

23. A method for projecting the effect on air quality resulting from varying collected natural and man-made air quality information, said method comprising the steps of:

(a) acquiring factual natural and man-made air quality information on a real time basis;

(b) retrieving pre-existing factual air quality information of selected subject matter from a source;

(c) correlating selected identified information with corresponding retrieved information;

(d) varying selected parameters of the retrieved factual information;

(e) analyzing the correlated information to obtain simulation scenarios of the impact upon air pollution resulting from the selected variations of factual information; and (f) presenting the analyzed simulation scenarios.

24. A method for projecting the effect on air quality resulting from varying collected natural and man-made air quality information, said method comprising the steps of:

(a) acquiring factual natural and man-made air quality information on a real time basis;

(b) retrieving pre-existing factual air quality information of selected subject matter from a source;

(c) correlating selected identified information with corresponding retrieved information;

(d) varying selected parameters of the acquired factual information;

(e) analyzing the correlated information to obtain simulation scenarios of the impact upon the pollutants present resulting from the selected variations of factual information; and (f) presenting the analyzed simulation scenarios.

* * * * *